US012746614B2

(12) United States Patent
Chen et al.

(10) Patent No.: US 12,746,614 B2
(45) Date of Patent: Sep. 29, 2026

(54) OXYGEN DETECTION SYSTEM AND REFLOW FURNACE USING THE SAME

(71) Applicant: Illinois Tool Works Inc., Glenview, IL (US)

(72) Inventors: Yuexin Chen, Suzhou New District (CN); Zhixue Liu, Suzhou New District (CN)

(73) Assignee: Illinois Tool Works Inc., Glenview, IL (US)

( * ) Notice: Subject to any disclaimer, the term of this patent is extended or adjusted under 35 U.S.C. 154(b) by 26 days.

(21) Appl. No.: 18/863,876

(22) PCT Filed: May 5, 2023

(86) PCT No.: PCT/US2023/021232
§ 371 (c)(1),
(2) Date: Nov. 7, 2024

(87) PCT Pub. No.: WO2023/219906
PCT Pub. Date: Nov. 16, 2023

(65) Prior Publication Data
US 2026/0183856 A1 Jul. 2, 2026

(30) Foreign Application Priority Data
May 9, 2022 (CN) ......................... 202210497941.5

(51) Int. Cl.
*B23K 1/00* (2006.01)
*B23K 1/008* (2006.01)
(Continued)

(52) U.S. Cl.
CPC ................ *B23K 1/008* (2013.01); *F23K 3/08* (2013.01); *F27D 21/00* (2013.01); *F27D 2019/0012* (2013.01)

(58) Field of Classification Search
CPC .... B23K 1/008; B23K 3/08; B23K 1/00–206; B23K 3/00–087; B23K 2101/36–42; F27D 21/00; F27D 2019/0012
(Continued)

(56) References Cited

U.S. PATENT DOCUMENTS 5,096,110 A * 3/1992 Schmatz ................ B23K 1/002 228/8
2007/0284408 A1* 12/2007 Asai ........................ B23K 1/008 228/42
2021/0339330 A1* 11/2021 Yan ........................ G05D 27/02
(Continued)

FOREIGN PATENT DOCUMENTS

CN 1665632 A * 9/2005 ............. B23K 1/012
CN 1893774 A * 1/2007 ............. B23K 1/008
(Continued)

OTHER PUBLICATIONS

Int'l Search Report and Written Opinion Appln No. PCT/US2023/021232 mailed Sep. 11, 2023.
(Continued)

*Primary Examiner* — Kiley S Stoner
(74) *Attorney, Agent, or Firm* — McAndrews Held & Malloy, Ltd.

(57) ABSTRACT

The present application provides an oxygen detection system for a reflow furnace. The oxygen detection system includes a first gas receiving device, a second gas receiving device, an oxygen detection device, and a chamber switching device. The gas in each furnace chamber of the first group of furnace chambers is switchable into the first chamber of the first gas receiving device. The gas in each furnace chamber of the second group of furnace chambers is switchable into the second chamber of the second gas receiving device. The chamber switching device is switchably in fluid communication with one of the first chamber and the second chamber, while the gas suction device is in
(Continued)

fluid communication with the other of the first chamber and the second chamber.

12 Claims, 4 Drawing Sheets

(51) Int. Cl.

| | |
|---|---|
| ***B23K 3/00*** | (2006.01) |
| ***F23K 3/08*** | (2006.01) |
| ***F27D 21/00*** | (2006.01) |
| *F27D 19/00* | (2006.01) |

(58) Field of Classification Search
USPC ........ 228/102–103, 218–220, 179.1–180.22, 228/8–12, 42–43
See application file for complete search history.

(56) References Cited

U.S. PATENT DOCUMENTS

| | | | | |
|---|---|---|---|---|
| 2024/0044834 | A1* | 2/2024 | Chen | F27D 21/00 |
| 2024/0230232 | A1* | 7/2024 | Chen | F27B 9/045 |
| 2025/0063708 | A1* | 2/2025 | Müller | H05K 13/0465 |
| 2026/0085891 | A1* | 3/2026 | Chen | F27B 9/40 |

FOREIGN PATENT DOCUMENTS

| | | | | | |
|---|---|---|---|---|---|
| CN | 103203509 | | | 7/2013 | |
| CN | 104871655 | A | * | 8/2015 | B23K 35/383 |
| CN | 205834426 | | | 12/2016 | |
| CN | 106881517 | A | * | 6/2017 | B23K 9/16 |
| CN | 112163692 | | | 1/2021 | |
| CN | 113843467 | A | * | 12/2021 | B23K 1/0056 |
| JP | 2005175475 | A | * | 6/2005 | |
| JP | 5077475 | B1 | * | 11/2012 | B23K 1/008 |
| JP | 2014511768 | A | * | 5/2014 | B23K 1/00 |
| KR | 100767071 | B1 | * | 10/2007 | B23K 1/20 |
| TW | 202010588 | | | 3/2020 | |
| WO | WO-2022186966 | A1 | * | 9/2022 | H05K 3/34 |
| WO | WO-2022251052 | A1 | * | 12/2022 | F27B 9/045 |
| WO | WO-2023219906 | A1 | * | 11/2023 | F27D 19/00 |
| WO | WO-2024044086 | A1 | * | 2/2024 | H05K 3/3494 |
| WO | WO-2024097588 | A1 | * | 5/2024 | H05K 3/3494 |

OTHER PUBLICATIONS

Taiwanese Search Report Appln No. No. 112110677 dated Jun. 15, 2026.

* cited by examiner

OXYGEN DETECTION SYSTEM AND REFLOW FURNACE USING THE SAME

CROSS-REFERENCE TO RELATED APPLICATIONS

The present application is a national stage application under 35 U.S.C. § 371 of application Serial No. PCT/US2023/021232, filed on May 5, 2023, and entitled "OXYGEN DETECTION SYSTEM AND REFLOW FURNACE USING THE SAME." The aforementioned application is hereby incorporated herein by reference in its entirety.

TECHNICAL FIELD

The present disclosure relates to an oxygen detection system for a reflow furnace and a reflow furnace using the same.

BACKGROUND

In the production of printed circuit boards, electronic elements are typically mounted to circuit boards using a process called "reflow soldering." In a typical reflow soldering process, a soldering paste (e.g., tin paste) is deposited into a selected area on a circuit board, and the wire of one or more electronic elements is inserted into the deposited soldering paste. The circuit board then passes through a reflow furnace in which the soldering paste reflows (i.e., is heated to a melting or reflow temperature) in a heating area and then cools in a cooling area to form solder joints electrically and mechanically connecting the wires of the electronic elements to the circuit board. As used herein, the term "circuit board" comprises a substrate assembly of any type of electronic element, such as comprises a wafer substrate. During the process of reflow soldering, if the oxygen content in the reflow furnace is too high, air holes will occur at the soldering point, which will affect the quality of the soldering.

SUMMARY

The present application provides an oxygen detection device for rapidly detecting the oxygen content in the furnace chamber of the reflow soldering furnace, thereby enabling the timely adjustment of the oxygen content in the furnace chamber to avoid the creation of air holes at the soldering point, thereby improving the soldering quality.

According to one aspect of its own application, the present application provides an oxygen detection system for a reflow furnace comprising n furnace chambers and n gas channels. Each gas channel T(i)(i=1, 2, . . . , n) of the n gas channels has a gas channel inlet R(i)(i=1, 2, . . . n) and a gas channel outlet C(i) (i=1, 2, . . . , n). Each furnace chamber L(i)(i=1, 2, . . . , n) of the n furnace chambers is in fluid communication with a gas channel inlet R(i) of the respective one gas channel T(i) of the n gas channels. The n furnace chambers and the n gas channels are divided into at least two groups comprising a first group of furnace chambers, a second group of furnace chambers, a first group of gas channels, and a second group of gas channels. The first group of furnace chambers includes j furnace chambers; the first group of gas channels includes j gas channels; the second group of furnace chambers includes k furnace chambers; the second group of gas channels includes k gas channels; the first group of furnace chambers is in fluid communication with the first group of gas channels, and the second group of furnace chambers is in fluid communication with the second group of gas channels, wherein j+k=n. The oxygen detection system comprises:

a first gas receiving device comprising a first chamber configured to be in switchable fluid communication with a gas channel outlet C(i) of each gas channel T(i) of the first group of gas channels such that the gas in each furnace chamber L(i) of the first group of furnace chambers is switchable into the first chamber;

a second gas receiving device comprising a second chamber configured to be in switchable fluid communication with a gas channel outlet C(i) of each gas channel T(i) of the second group of gas channels such that the gas in each furnace chamber L(i) of the second group of furnace chambers is switchable into the first chamber;

an oxygen detection device switchably in fluid communication with the first chamber and the second chamber;

a gas suction device switchably in fluid communication with the first chamber and the second chamber;

a chamber switching device that enables the oxygen detection device to be in switchable communication with one of the first chamber and the second chamber, and the chamber switching device in switchable fluid communication with the other of the first chamber and the second chamber;

wherein, (1) the second chamber is fluidly disconnected with the oxygen detection device and in fluid communication with the gas suction device while the chamber switching device enables the first chamber to be in fluid communication with the oxygen detection device;

(2) the first chamber is fluidly disconnected with the oxygen detection device and in fluid communication with the gas suction device while the chamber switching device enables the second chamber to be in fluid communication with the oxygen detection device.

The oxygen detection system described above also includes a first gas channel switching device and a second gas channel switching device. The first gas channel switching device enables the gas channel outlet C(i) for each gas channel T(i) of the first group of gas channels to be alternately in fluid communication with the first chamber. The second gas channel switching device enables the gas channel outlet C(i) of each gas channel T(i) of the second group of gas channels to be alternately in fluid communication with the second chamber.

The oxygen detection system described above includes the chamber switching device configured to: (1) rotatingly fluidize the first chamber and the second chamber with the oxygen detection device, and rotatingly and fluidly isolate the first chamber and the second chamber from the oxygen detection device; and (2) rotatingly fluidize the second chamber and the first chamber with the gas suction device, and rotatingly and fluidly isolate the first chamber and the second chamber from the gas suction device.

The oxygen detection device in the oxygen detection system described above includes a control device that controls the chamber switching device, the first gas channel switching device, and the second gas channel switching device.

The oxygen detection system described above, wherein the first group of furnace chambers includes furnace chambers in an odd sequence L(1), L(3), L(5), . . . . The second group of furnace chambers includes furnace chambers in an even sequence L(2), L(4), L(6), . . . . The detection sequence of the first group of furnace chambers by the oxygen detection device (121) is: L(1), L(3), L(5), . . . . The detection sequence of the second group of furnace chambers by the oxygen detection device (122) is: L(2), L(4), L(6), . . .

The oxygen detection system described above, wherein when the oxygen detection device detects the oxygen content in the furnace chamber L(1) of the first group of furnace chambers, the control device: (i) controls the first gas channel switching device to be in fluid communication with the corresponding gas channel outlet C(1) of the furnace chamber L(1) and the first chamber such that the first chamber receives gas from the furnace chamber L(1); (ii) controls the second gas channel switching device to be in fluid communication with the corresponding gas channel outlet C(2) of the furnace chamber L(2) in the second group of furnace chambers and the second chamber such that the second chamber receives gas from the furnace chamber L(2); and (iii) controls the chamber switching device to enable the oxygen detection device to be in fluid communication with the first chamber such that the oxygen detection device can detect the oxygen content in the furnace chamber L(1) and that the gas suction device is in fluid communication with the second chamber, so the gas from the furnace chamber L(2) fills the gas flow path from the furnace chamber L(2) to the gas suction device.

The oxygen detection system described above, wherein when the oxygen detection device detects the oxygen content in the furnace chamber L(2) of the second group of furnace chambers, the control device: (i) controls the second gas channel switching device to be in fluid communication with the corresponding gas channel outlet C(2) of the furnace chamber L(2) and the second chamber such that the second chamber receives gas from the furnace chamber L(2); (ii) controls the first gas channel switching device to be in fluid communication with the corresponding gas channel outlet C(3) of the furnace chamber L(3) in the first group of furnace chambers and the first chamber such that the first chamber receives gas from the furnace chamber L(3); and (iii) controls the chamber switching device to enable the oxygen detection device to be in fluid communication with the second chamber such that the oxygen detection device can detect the oxygen content in the furnace chamber L(2) and that the gas suction device is in fluid communication with the first chamber, so the gas from the furnace chamber L(3) fills the gas flow path from the furnace chamber L(3) to the gas suction device.

The chamber switching device in the oxygen detection system described above comprises: a first inlet of the chamber switching device in fluid communication with the first chamber; a second inlet of the chamber switching device in fluid communication with the second chamber; the first outlet of the chamber switching device wherein the control device controls the first outlet of the chamber switching device to be alternatively in fluid communication with one of the first inlet of the chamber switching device and the second inlet of the chamber switching device; and the second outlet of the chamber switching device wherein the control device controls the second outlet of the chamber switching device to be alternatively in fluid communication with the other of the first inlet of the chamber switching device and the second inlet of the chamber switching device.

The oxygen detection system described above, wherein the first gas channel switching device includes a plurality of first gas channel switching switches and a plurality of second gas channel switching switches. The control device controls the plurality of first gas channel switching switches to enable the gas channel outlet C(i) of each gas channel T(i) in the first group of gas channels to alternatively communicate with the first chamber, and controls the plurality of second gas channel switching switches to enable the gas channel outlet C(i) of each gas channel T(i) in the second group of gas channels to alternatively communicate with the second chamber.

The oxygen detection system described above, wherein each of the plurality of first gas channel switching switches includes a first gas channel switching switch inlet and a first gas channel switching switch outlet, each first gas channel switching switch inlet being in fluid communication with one furnace chamber L(i) of the first group of furnace chambers, the first gas channel switching switch outlet to fluidly communicate with the first chamber, wherein the control device controls each of the first gas channel switching switch inlet to alternatively in fluid communication with the first gas channel switching switch outlet such that the gas from the furnace chamber L(i) of the first group of furnace chambers corresponding to each of the first gas channel switching switch flows into the first chamber. Each of the plurality of second gas channel switching switches includes a second gas channel switching switch inlet and a second gas channel switching switch outlet, each of the second gas channel switching switch inlet being in fluid communication with the furnace chamber L(i) of the second group of furnace chambers, the second gas channel switching switch outlet being in fluid communication with the second chamber, and the control device controls each of the second gas channel switching switch inlet to fluidly communicate with the corresponding second gas channel switching switch outlet such that the gas from the furnace chamber L(i) of the second group of furnace chambers corresponding to each of the first gas channel switching switch flows into the second chamber.

The oxygen detection system described above, wherein the chamber switching device is a 2-bit 4-way solenoid valve.

The oxygen detection system described above, wherein the first gas channel switching switch and the second gas channel switching switch are 2-bit 3-way solenoid valves.

The oxygen detection system described above, wherein the oxygen detection device comprises an air pump.

The oxygen detection system described above, wherein the gas suction device is an air pump.

The oxygen detection system described above includes an oxygen conditioning device (130) that adjusts the amount of oxygen in the n furnace chambers based on the detection results of the oxygen content in the n furnace chambers.

According to another aspect of the present application, the present application provides for a reflow furnace comprising:

n furnace chambers;

n gas channels, each gas channel T(i)(i, i=1, 2, . . . , n) of the n gas channels having a gas channel inlet R(i)(i, i=1, 2, . . . n) and a gas channel outlet C(i)(i, i=1, 2, . . . , n), each furnace chamber L(i)(i=1, 2, . . . , n) of the n furnace chambers being in fluid communication with the gas channel inlet R(i) of a gas channel T(i) of the n gas channels;

Oxygen detection system according to the present application.

DETAILED DESCRIPTION

Figure 1:
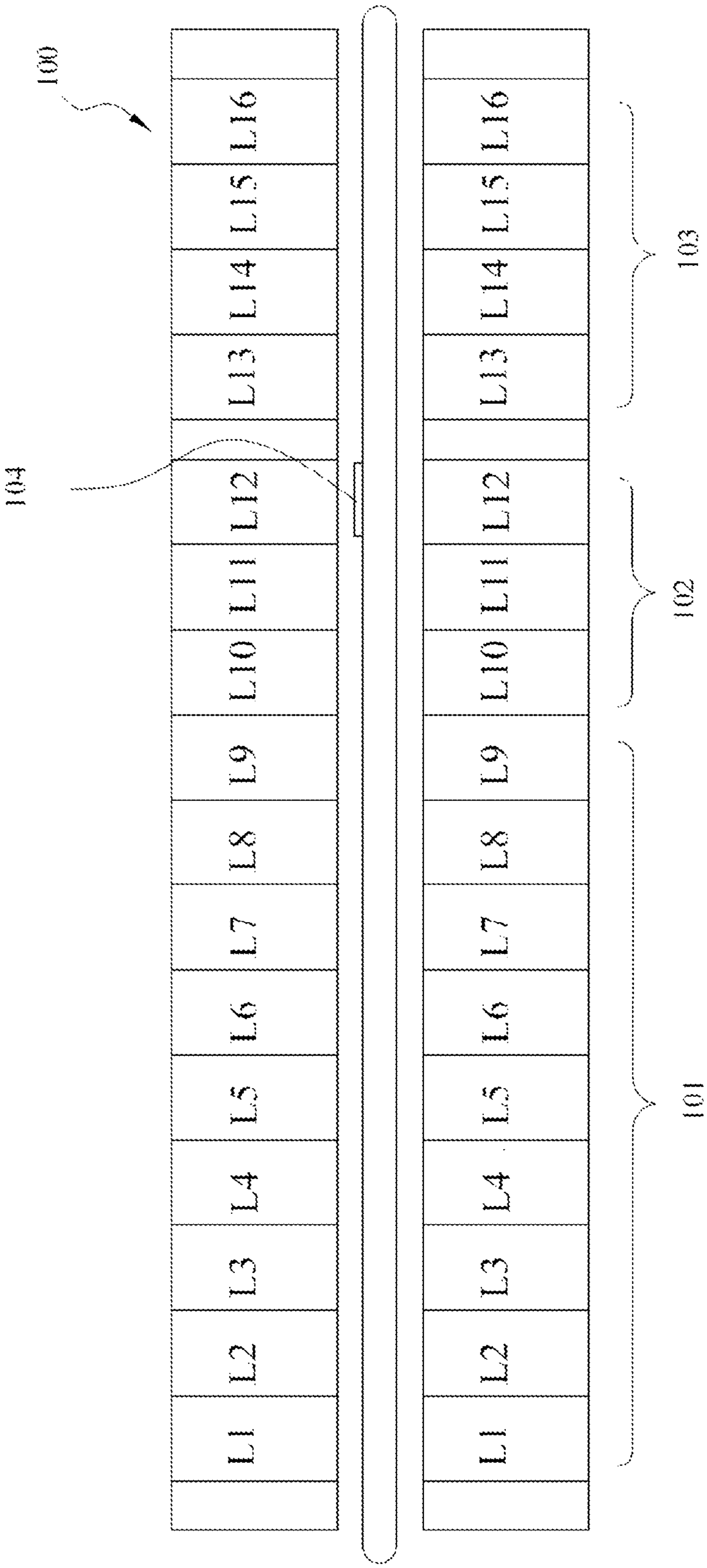
FIG. 1 is a schematic diagram of a reflow furnace in accordance with an embodiment of the present application.

Various specific embodiments of the present application will be described below with reference to the attached drawings that form a part of the present specification. It should be understood that the same or similar reference numerals used in the present application refer to the same components where possible.

FIG. 1 is a simplified schematic diagram of the reflow furnace 100 to show a furnace setup, according to one embodiment of the present application. As shown in FIG. 1, the reflow furnace 100 includes a furnace cavity and n furnace chambers disposed in the furnace cavity, which form sequentially disposed preheating region 101, peak region 102, and cooling region 103. The circuit board 104 to be processed for soldering along the conveying direction through the preheating region 101, the peak region 102, and the cooling region 103. In the embodiment shown in FIG. 1, the number n of the furnace chambers is 16. It will be understood that the present application is equally applicable to other types of reflow furnaces, which may have a different number of n furnace chambers, which may include, but are not limited to, 12 or 14.

Figure 2:
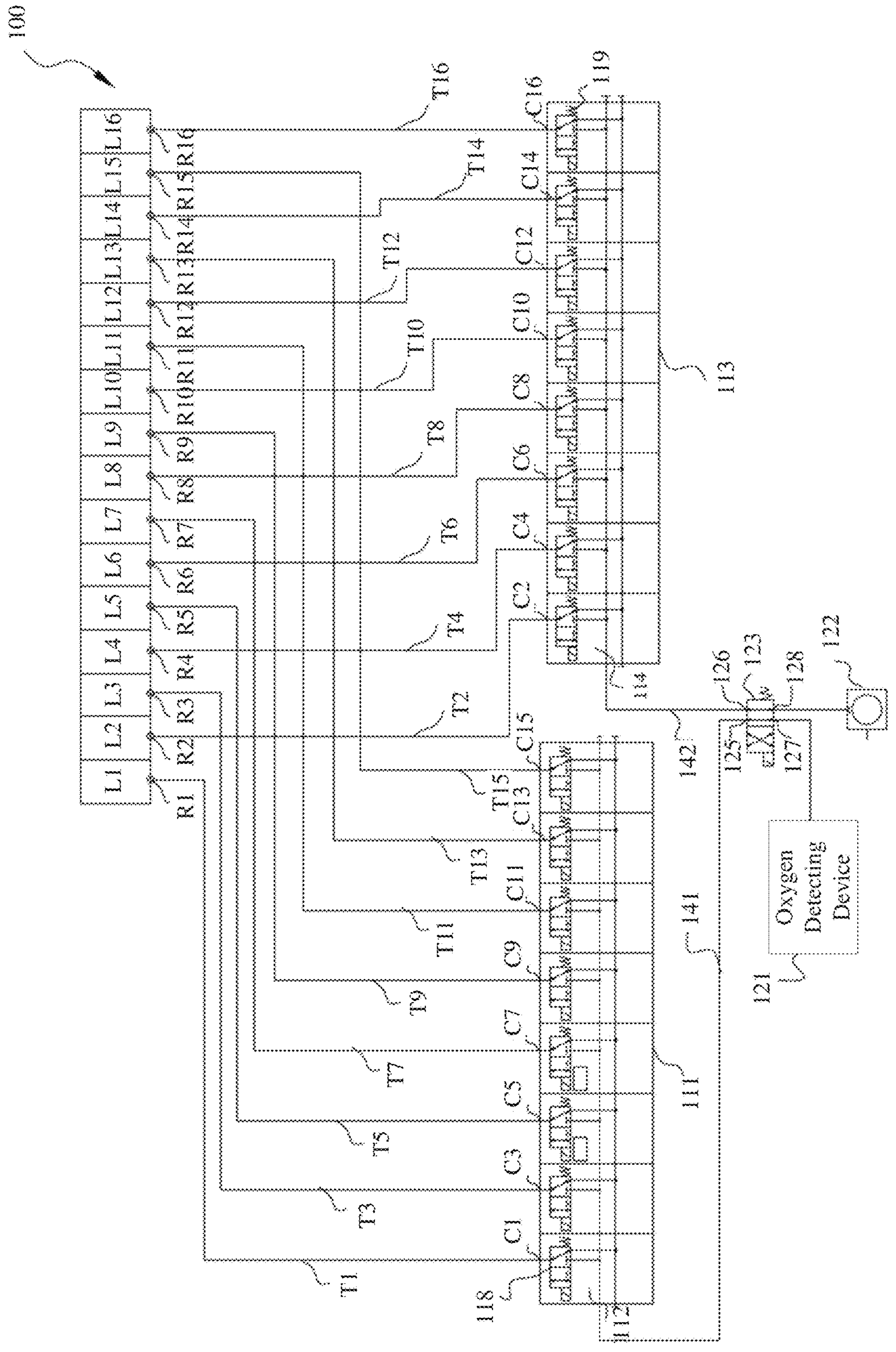
FIG. 2 is a gas path diagram of the present application for the reflow furnace of FIG. 1.

FIG. 2 is a gas path diagram of the present application for the reflow furnace 100 shown in FIG. 1, illustrating a grouping and switching device for the gas path. As shown in FIG. 2, 16 furnaces of the reflow furnace 100 are shown as L(1)-L(16). The reflow furnace 100 also includes n gas channels corresponding to the number of furnace chambers. In the embodiment shown in FIG. 2, the number of gas channels is 16, which are shown as T(1)-T (16), to correspond to the number of furnace chambers. These 16 gas channels have gas channel inlets R(1)-R (16) and gas channel outlets C(1)-C(16), respectively. As shown in FIG. 2, each furnace chamber is in fluid communication with the gas channel inlets of a gas channel. It will be understood that when the present application is applied to a reflow furnace having different quantities of furnace chambers, and that the number of gas channels varies correspondingly with the number of furnace chambers such that one furnace chamber corresponds to one gas channel.

The 16 furnace chambers may be divided into at least two groups. In the embodiment shown in FIG. 2, the furnace chambers are divided into two groups, comprising a first group of furnace chambers and a second group of furnace chambers, and the first group of furnace chambers and a second group of furnace chambers comprising eight furnace chambers, respectively. As one embodiment, the eight furnace chambers of the first group of furnace chambers are the furnace chambers L(1), L(3), L(5) . . . . L(15) in the odd sequence, and the eight furnace chambers of the second group of furnace chambers are the furnace chambers L(2), L(4), L(6) . . . . L(16) in the even sequence. Accordingly, the 16 gas channels are also divided into at least two groups of gas channels comprising a first group of gas channels and a second group of gas channels comprising eight gas channels respectively. As one embodiment, the 8 gas channels of the first group of gas channels are the gas channels T(1), T(3), T(5) . . . . T(15) in the odd sequence, and the 8 gas channels of the second group of gas channels are the gas channels T(2), T(4), T(6) . . . . T(16) in the even sequence. As discussed in detail below, the amount of oxygen in each furnace chamber will be detected in alternating order of one furnace chamber in the first group of furnace chambers and one furnace in the second group of furnace chambers. For example, the oxygen content in each furnace chamber may be detected in the order of the furnace chambers L(1), L(2), L(3) . . . . L(16). The 16 gas channels have gas channel inlets R(1), R(2), R(3) . . . . R(16) and gas channel outlets C(1), C(2), C(3) . . . . C(16), each of which is in fluid communication with a respective furnace chamber. Although in the embodiment of FIG. 2, the furnace chambers are grouped in odd or even sequence, it should be understood that in other embodiments, the furnace chambers can also be classified in other ways, such as by grouping the furnace chambers L(1)-L(8) in one group and the furnace chambers L(9)-L(16) in another group. In this grouping, the detection sequence of the oxygen content in each furnace chamber can change to L(1), L(9), L(2), L(10) . . . . L(8), L(16) according to the principle of alternating detection of one furnace chamber in the first group of furnace chambers and one furnace chamber in the second group of furnace chambers. Additionally, although in the embodiment shown in FIG. 2, the furnace chambers are divided into two groups, it should be understood that the furnace chambers can also be divided into three or more groups as long as alternating detection between the different groups of furnace chambers can be achieved.

The reflow furnace 100 also has two groups of gas channel switching devices. In the embodiment shown in FIG. 2, the two groups of gas channel switching devices are the integrated valve seats 111 and 113, respectively. The integrated valve seat 111 has a chamber 112 for receiving gas from the furnace chamber of the first group of furnace chambers and the integrated valve seat 111 is integrated with eight 2-bit 3-way solenoid valves 118 for switching the chamber 112 to be fluid communication with different furnace chambers of the first group of furnace chambers.

Figure 3:
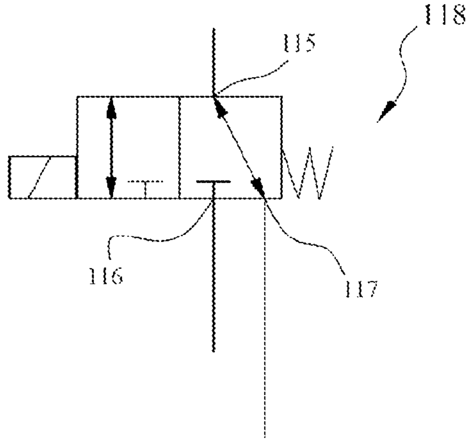
FIG. 3 is an enlarged view of the 2-bit 3-way solenoid valve in the gas road map of FIG. 2.

FIG. 3 is an enlarged view of a solenoid valve that further illustrates the configuration of the solenoid valve 118, illustrating a more detailed structure of the solenoid 118. As shown in FIG. 3, the solenoid valve 118 has a gas inlet 115, a gas outlet 116, and a gas cutoff end 117, the gas inlet 115 being in fluid communication with an outlet of a respective gas channel in the first set of gas channels, the gas outlet 116 being in fluid communication with the chamber 112, and at the gas cutoff end 117, the flow of gas toward the chamber 112 is stopped such that the gas does not enter the chamber 112. The gas inlet 115 of each solenoid valve 118 can be switchably in fluid communication with one of the gas outlet 116 and the gas cutoff end 117 such that a respective gas channel can switchably in fluid communication or no communication with the chamber 112 of the integrated valve seat 111 such that gas in a respective furnace chamber enters or does not enter the chamber 112. In particular, when the solenoid valve 118 is powered on, the gas outlet 116 and the gas inlet 115 of the solenoid valve 118 are in fluid communication such that the respective gas channel and the chamber 112 of the integrated valve seat 111 are in fluid communication such that the gas from the respective furnace chamber in the first group of furnace chambers cannot enter the chamber 112; when the solenoid valve 118 is not powered on, the gas inlet 115 of the solenoid valve 118 is in fluid communication with the gas stop end 117, as the gas stop end 117 stops the as from flowing towards the chamber 112, the respective gas channel and the chamber 112 of the integrated valve seat 111 are in fluid isolation such that the gas from the corresponding furnace chamber of the first group of furnace chambers cannot enter the chamber 112. The solenoid valves 118 are operable to be alternately controlled such that the respective gas channels and the chamber 112 of the integrated valve seat 111 are rotationally in fluid communication such that the gas in the respective furnace alternates into the chamber 112.

Similarly, the integrated valve seat 113 has a chamber 114 for receiving gas from the furnace chamber of the second group of furnace chambers. And the integrated valve seat 113 is integrated with eight 2-bit 3-way solenoid valves 119 for switching the chamber 114 to be in fluid communication with different furnace chambers of the second group of furnace chambers. The solenoid valve 119 has the same configuration as the solenoid valve 118. The solenoid valve 119 has a gas inlet, a gas outlet, and a gas cutoff end, the gas inlet communicating with the corresponding gas channel of the second group of gas channels, the gas outlet and the chamber 114 are in fluid communication; at the gas cutoff end, the flow of gas towards the chamber 114 is stopped such that the gas does not enter the chamber 114. Each gas inlet 115 can be switchably in fluid communication with one of the gas outlet and the gas cutoff end, such that a respective gas channel can switchably be in fluid communication or no communication with the chamber 114 of the integrated valve seat 113 such that gas in a respective furnace chamber enters or does not enter the chamber 114. Specifically, when the solenoid valve 119 is powered on, the gas inlet and gas outlet of the solenoid valve 119 are in fluid communication such that the respective gas channel and the chamber 114 of the integrated valve seat 113 are in fluid communication such that the gas from the respective furnace chamber in the second group of furnace chambers cannot enter the chamber 114; when the solenoid valve 119 is not powered on, the gas inlet and gas cutoff end of the solenoid valve 119 are in fluid communication; as the gas cutoff end stops the gas from flowing towards the chamber 114, the respective gas channel are the chamber 114 of the integrated valve seat 113 are in isolation such that the gas from the corresponding furnace chamber of the second group of furnace chambers does not enter the chamber 114. The solenoid valves 119 are able to be alternately controlled such that the respective gas channel and the chamber 114 of the integrated valve seat 113 are rotationally in fluid communication such that the gas in the respective furnace alternatively flows into the chamber 114.

It shall be noted that the gas inlets of the solenoid valves 118 and 119 shown in FIG. 2 as schematic gas path diagrams are in a state connected to the gas cutoff end, i.e., the solenoid valves 118 and 119 in FIG. 2 are not powered such that the respective gas channels and the chamber of the integrated valve seat are fluidly isolated. It will be appreciated that in actual use, the solenoid valves 118 and 119 should each be in an electrical or non-electric state as needed based on the need to control the rotational fluid communication of the chambers of the various gas channels and respective integrated valve seats.

Although in the embodiment of FIG. 2, the gas channel switching device is shown as integrated valve seats 111 and 113 integrated by a plurality of solenoid valves 118 or 119, and chambers 112 and 114 for receiving gas from various furnace chambers are integrated in the integrated valve seats 111 and 113, it should be understood that in other embodiments, chambers 112 and 114 may be configured independently of the integrated valve seats 111 and 113, and may use any suitable structure to achieve rotational gas circulation of different gas channels and chambers 112 or 114 in embodiments used not only for FIG. 2 where solenoid valves 118 and 119 are used.

With continued reference to FIG. 2, FIG. 2 further illustrates an oxygen detection device 121 and a gas suction device 122. The oxygen detection device 121 is used to detect the oxygen content in the various furnace chambers, and the gas suction device 122 is used to draw the gas from the various furnace chambers to fill its flow path. In an embodiment, the oxygen detection device 121 is an oxygen analyzer with an air pump installed and the gas suction device 122 is an air pump.

The reflow furnace 100 also has a chamber switching device for achieving switchable fluid communication of the chamber 112 and the chamber 114 with the oxygen detection device 121 and the gas suction device 122. In the embodiment shown in FIG. 2, a 2-bit 4-way solenoid valve 123 is used as the chamber switching device. As shown in FIG. 2, the solenoid valve 123 has two gas inlets 125 and 126, and two gas outlets 127 and 128. The gas inlet 125 and the chamber 112 of the integrated valve seat 111 are in fluid communication, the gas inlet 126 and the chamber 114 of the integrated valve seat 113 are in fluid communication, the gas outlet 127 and the oxygen detection device 121 are in fluid communication, the gas outlet 128 and the gas suction device 122 are in fluid communication. When the solenoid valve 123 is not powered, the gas inlet 125 and the gas outlet 127 of the solenoid valve 123 are in fluid communication, while the gas inlet 126 and the gas outlet 128 of the solenoid valve 123 are in fluid communication such that the chamber 112 and the gas suction device 122 are fluidly isolated and in fluid communication with the oxygen detection device 121 such that the oxygen detection device 121 is able to detect oxygen content in the furnace chamber of the first group of furnace chambers, and the chamber 114 and the oxygen detection device 121 are fluidly isolated and in fluid communication with the gas suction device 122 such that the gas from the furnace chamber of the second group of furnace chambers can fill the entire gas flow path from the corresponding furnace chamber to the gas suction device 122. When the solenoid valve 123 is powered, the gas inlet 125 and the gas outlet 128 of the solenoid valve 123 are in fluid communication, the gas inlet 126 and the gas outlet 127 of the solenoid valve 123 are in fluid communication such that the chamber 114 and the gas suction device 122 are fluidly isolated and in fluid communication with the oxygen detection device 121 such that the oxygen detection device 121 is able to detect oxygen content in the furnace chamber of the second group of furnace chambers, and the chamber 112 and the oxygen detection device 121 are fluidly isolated but in fluid communication with the gas suction device 122 such that the gas from the furnace chamber of the first group of furnace chambers can fill the entire gas flow path from the corresponding furnace chamber to the gas suction device 122. Although in the embodiment of FIG. 2, the 2-bit 4-way solenoid valve 123 is used as a chamber switching device to achieve switchable communication of the chamber 112 and chamber 114 with the oxygen detection device 121 and the gas suction device 122, it should be understood that in other embodiments, switchable communication of the chamber 112 and chamber 114 with the oxygen detection device 121 and the gas suction device 122 may be achieved through other structures.

Figure 4:
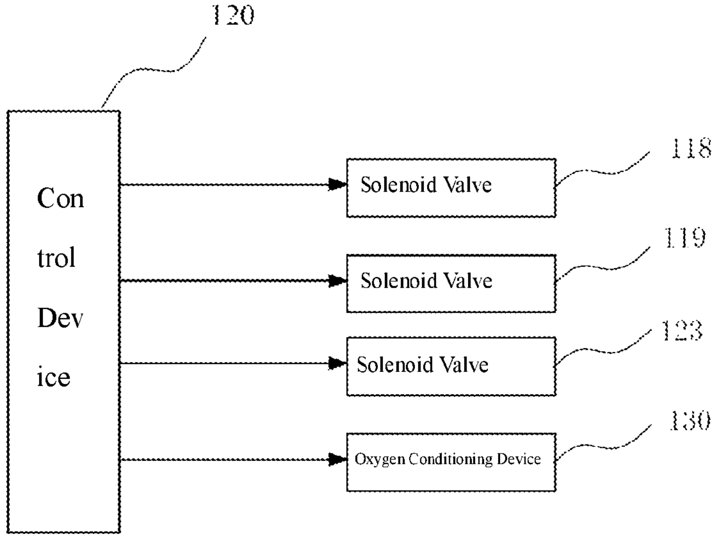
FIG. 4 is a functional block diagram of the oxygen detection system.

FIG. 4 shows a functional block diagram of an oxygen detection system. As shown in FIG. 4, the oxygen detection system further includes a control device 120 for controlling the solenoid valves 118, 119, and 123.

The oxygen detection device 121 detects the oxygen content in each furnace chamber in the order of L(1), L(2), L(3) . . . . L(16). To enable the oxygen detection device 121 to detect the oxygen content in the furnace chamber L(1) in the first group of furnace chambers, the control device 120 is controlled such that the solenoid valve 118 connected to the furnace chamber L(1) in the first group of furnace chambers is powered such that the outlet C(1) and chamber 112 corresponding to the gas channels T(1) of the furnace chamber L(1) are in fluid communication such that the gas in the furnace chamber L(1) enters the chamber 112; the solenoid valve corresponding to other furnace chambers of the first group of furnace chambers is controlled not to be powered such that the gas channel outlets corresponding to other furnace chambers of the first group of furnace chambers are fluidly isolated from the chamber 112 so that the gas from these furnace chambers do not enter the chamber 112. Moreover, the control device 120 is controlled such that the solenoid valve 119 coupled to the furnace chamber L(2) in the second group of furnace chambers is powered such that the outlet C(2) corresponding to the gas channel T(2) of the furnace chamber L(2) and the chamber 114 are in fluid communication such that the gas in the furnace chamber L(2) enters the chamber 114; the solenoid valve 119 corresponding to other furnace chambers of the second group of furnace chambers is controlled not to be powered such that the gas channel outlets corresponding to other furnace chambers of the second group of furnace chambers are fluidly isolated from the chamber 114 so that the gas from these furnace chambers do not enter the chamber 114. At the same time, the control device 120 controls that the solenoid valve 123 is not powered such that the gas inlet 125 and the gas outlet 127 of the solenoid valve 123 are in fluid communication while the gas inlet 126 and the gas outlet 128 of the solenoid valve 123 are in fluid communication. As such, the oxygen detection device 121 and the chamber 112 are in fluid communication such that the gas from the furnace chamber L(1) in the chamber 112 is able to enter the oxygen detection device 121 such that the oxygen detection device 121 is able to detect the oxygen content in the gas of the furnace chamber L(1); and the gas suction device 122 and the chamber 114 are in fluid communication such that the gas from the furnace chamber L(2) is able to be sucked by the gas suction device 122 to fill the entire gas flow path from the furnace chamber L(2) to the gas suction device 122; the gas flow path includes the gas channel T(2), the chamber 114, and the gas channel 142 from the chamber 114 to the gas suction device 122.

After the oxygen detection device 121 performs the detection of gas in the furnace chamber L(1) for a predetermined time, the control device 120 controls the solenoid valves 118, 119, and 123 to enable the oxygen detection device 121 to detect the oxygen content in the furnace chamber L(2) in the second group of furnace chambers. Specifically, when the oxygen detection device 121 performs a predetermined time of detection of gas in the furnace chamber L(1), the control device 120 controls to maintain the solenoid valve 119 connected to the furnace chamber L(2) of the second group of furnace chambers such that outlet C(2) of the corresponding gas channel T(2) of the furnace chamber L(2) and the second chamber 114 are in fluid communication so that the gas in the furnace chamber L(2) remains in chamber 114; the solenoid valve 119 corresponding to other furnace chambers of the second group of furnace chambers is controlled not to be powered such that the gas channel outlets corresponding to other furnace chambers of the second group of furnace chambers are fluidly isolated from the chamber 114 so that the gas from these furnace chambers do not enter the chamber 114. Moreover, the control device 120 is controlled such that the solenoid valve 118 coupled to the furnace chamber L(3) in the first group of furnace chambers is powered such that the outlet C(3) of the gas channel T(3) corresponding to the furnace chamber L(3) is in fluid communication with the second chamber 112 such that the gas in the furnace L(3) enters the chamber 112; the solenoid valve 118 corresponding to other furnace chambers of the first group of furnace chambers is controlled not to be powered such that the gas channel outlets corresponding to other furnace chambers of the first group of furnace chambers are fluidly isolated from the chamber 112 so that the gas from these furnace chambers do not enter the chamber 112. At the same time, the control device 120 controls such that the solenoid valve 123 is powered such that the gas inlet 125 and the gas outlet 128 of the solenoid valve 123 are in fluid communication while the gas inlet 126 and the gas outlet 127 of the solenoid valve 123 are in fluid communication. As such, the oxygen detection device 121 and the second chamber 114 are in fluid communication such that the gas from the furnace chamber L(2) in the chamber 114 is able to enter the oxygen detection device 121 such that the oxygen detection device 121 is able to detect the oxygen content in the gas of the furnace chamber L(2); and the gas suction device 122 and the second chamber 112 are in fluid communication such that the gas from the furnace chamber L(3) is able to be sucked by the gas suction device 122 to fill the entire gas flow path from the furnace chamber L(3) to the gas suction device 122; the gas flow path includes the gas channel T(3), the chamber 112, and the gas channel 141 from the chamber 112 to the gas suction device 122.

In such a way, after performing detection of gas in the furnace chamber L(2) in the second group of furnace chambers for a predetermined time, the control device 120 controls the solenoid valves 118, 119, and 123 such that the oxygen detection device 121 detects the oxygen content in the first group of furnace chambers L(3) and completes detection of the oxygen content of the entire furnace in this order. Moreover, since the oxygen content in each furnace chamber of the reflow furnace 100 is changed in real time, the oxygen detection device 121 detects the oxygen content of each furnace chamber on an ongoing basis. Once the detection of the last furnace chamber has been completed, the oxygen detection device 121 proceeds to the next round of detection of all furnace chambers, i.e., again starting from the first furnace chamber. As such, the oxygen detection device 121 performs the detection cycle for the oxygen content of each furnace chamber.

Due to the above construction of the present application, in the process of detecting the furnace chamber L(1) of the first group of furnace chambers, the gas in the furnace chamber L(2) of the second group of furnace chambers has been primed with its entire gas flow path. After the oxygen detection device 121 completes the gas detection in the furnace chamber L(1) of the first group of furnace chambers, it is only necessary to change the connection between the two inlets and the two outlets of the solenoid valve 123. The oxygen detection device 121 can immediately begin the gas detection in the furnace chamber L(2) of the second group of furnace chambers. Similarly, since the gas in the furnace chamber L(3) of the first group of furnace chambers has been primed with its entire gas flow path during the process of detecting the furnace chamber L(2) of the second group of furnace chambers, the oxygen detection device 121 needs to switch the connection between the two inlets and the two outlets of the solenoid 123 again after the gas detection in the furnace chamber L(2) of the second group of furnace chambers is completed. The oxygen detection device 121 can immediately begin the detection of the gas in the furnace chamber L(3) of the first group of furnace chambers. By way of analogy, the present application improves the speed of detecting the oxygen content in the furnace chamber of the reflow furnace by allowing the gas in the furnace chamber of the next ordered position (i.e., the furnace chamber to be detected in the other group of furnace chambers) to be primed with its entire gas flow path when detecting the oxygen content in one of the furnace chambers in any group of furnace chambers. In particular, the long gas path from the furnace chamber to the oxygen detection device allows the gas in the furnace chamber to be detected to be filled with its entire flow path, which helps to speed up detection.

It should be understood that if the gas in the furnace chamber to be detected is not filled with its entire flow path in advance, since the gas path from the furnace chamber to the oxygen detection device is long, it will be necessary to wait for a period of time before the gas remaining in the chamber of the corresponding integrated valve seat of the furnace is discharged from the previous detected furnace chamber before the oxygen detection device 121 can detect the oxygen content in the furnace chamber. Moreover, since the oxygen detection device 121 detects the oxygen content of the furnace chamber in a cycle, it should be understood that the gas channels corresponding to the various furnace chambers will retain the gas of the furnace chamber at the previous time of detection. When detecting the oxygen content at the current time of each furnace chamber, it is necessary to wait a period of time to drain the gas remaining in the corresponding gas channel at the previous time of detection. Only in this way can the oxygen detection device 121 detects the oxygen content of the furnace chamber under the current detection time. These waiting times result in a slower rate of oxygen detection in the furnace chamber of the reflow furnace, which in turn affects the speed of adjustment of the oxygen content of each furnace chamber, which in turn tends to cause gas holes at the soldering site and affect the soldering quality. As analyzed above, the present application is constructed such that the gas in the furnace chamber to be detected in the next sequence is primed with its entire gas flow path, thereby avoiding these wait times, thereby increasing the detection speed, thereby facilitating improved soldering quality. For example, using a reflow furnace comprising 16 furnace chambers described in this application, one hypothesis of such a structure that does not charge the gas in the furnace chamber to be detected to its entire flow path in advance is: 16 furnace chambers are not grouped and, accordingly, only one integrated valve seat is provided, including sixteen 2-bit 3-way solenoid valves, which are connected through 16 gas channels and 16 furnace chambers, respectively. Since only one integrated valve seat is provided, i.e., only one chamber receiving gas in the furnace chamber, this hypothetical structure does not provide for a chamber switching device such as a 2-bit 4-way solenoid valve in this application. Thus, the chamber of the integrated valve seat in this hypothetical structure and the oxygen detection device are directly connected to convey the furnace chamber gas into the chamber of the integrated valve seat to the oxygen detection device for analysis. In this hypothetical structure, when the oxygen detection device detects the oxygen content in a certain furnace chamber, the 2-bit 3-way solenoid valve corresponding to the furnace chamber can be controlled and charged so that the gas in the furnace chamber enters the chamber of the integrated valve seat and then enters the oxygen detection device. At the same time, the other 2-bit 3-way solenoid valves must not be powered so that the gas in other furnace chambers cannot enter the chamber of the integrated valve seat and thereby enter the oxygen detection device. When the oxygen detection device ends the detection of the oxygen content in the furnace chamber, the corresponding 2-bit 3-way solenoid valve in the furnace chamber is switched to power-off state, so that the gas in the furnace chamber stops entering the chamber of the integrated valve seat and then the oxygen detection device; at the same time, the corresponding 2-bit 3-way solenoid valve in the next furnace chamber is switched to obtain electricity, so that the gas in the next furnace chamber enters the chamber of the integrated valve seat and then enters the oxygen detection device. In such a way, the oxygen detection device completes the detection of all furnace chambers and begins a new round of detection after one round of detection is completed. Obviously, in this hypothetical structure, for any one furnace chamber, the gas in that furnace chamber begins to enter its flow path only after the detection of that furnace chamber begins and then proceeds to the oxygen detection device. In other words, the gas in the next furnace chamber to be detected cannot be primed with its flow path when the oxygen detection device detects the oxygen content in one furnace chamber. Thus, in this hypothetical structure, for the detection of any furnace chamber, it is necessary to wait for a period of time so that the gas remaining in the furnace chamber's corresponding gas channel at the previous detection moment and the gas remaining in the previous detection furnace at the chamber of the integrated valve seat are excluded before the oxygen detection device can detect the oxygen content of the furnace chamber at the current moment. In particular, due to the long gas path from the furnace chamber to the oxygen detection device, the waiting time is longer. As a result, this hypothetical structure results in slow detection, which in turn affects the speed of adjustment of the oxygen content of each furnace chamber, thereby impairing the quality of the soldering.

The oxygen conditioning device 130 is also shown in FIG. 4. The control device 120 is capable of controlling the oxygen conditioning device 130 to adjust the oxygen content within the various furnace chambers according to the amount of oxygen detected by the oxygen detection device 121. As the present application improves the speed of oxygen detection in the furnace chamber of the reflow furnace, the oxygen content in the furnace chamber can be adjusted more quickly to avoid the air holes in the soldering position caused by excessive oxygen content, thereby improving the soldering quality.

Figure 5:
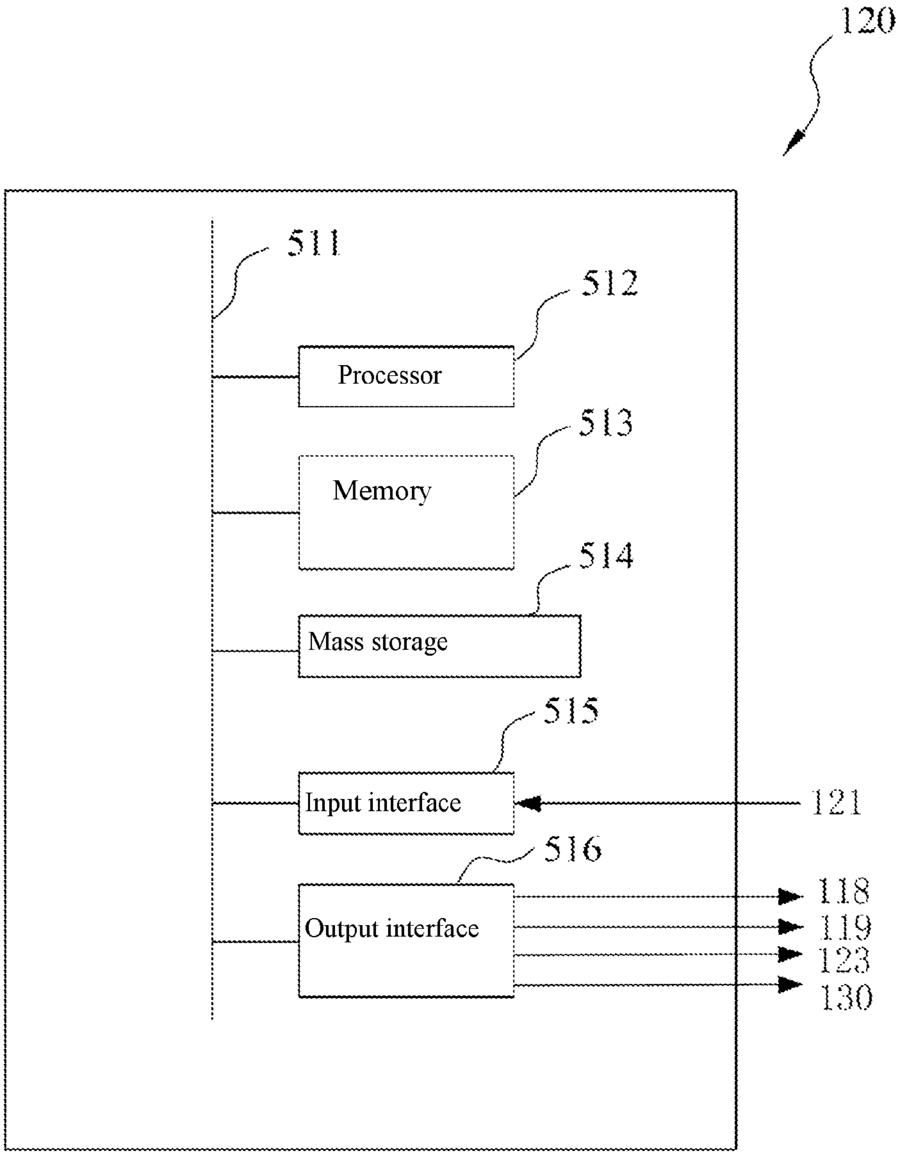
FIG. 5 is a schematic block diagram of the control device.

FIG. 5 is a schematic block diagram of the control device 120. As shown in FIG. 5, the control device 120 includes a bus 511. A processor 512, a memory 513, a mass storage 514, an input interface 515, and an output interface 516 are connected to the bus 511. The processor 512 may read out a program (or instructions) from memory 513 or mass storage 514 and execute the program (or instructions) to perform the control functions; the processor 512 may also write data or instructions into memory 513 or mass storage 514. Memory 513 and mass storage 514 may store programs (instructions) or data. Typically, memory 513 accesses faster than mass storage 514, while mass storage 514 has a memory size larger than memory 513. By executing the instructions in memory 513, processor 512 may control memory 513, mass storage 514, input interface 515, and output interface 516.

The output interface 516 sends a control signal to the solenoid valves 118, 119, and 123 to control the solenoid valves 118, 119, and 123 to be powered or not be powered such that the oxygen content in a furnace chamber can be detected and the gas to be detected is filled with its flow path. The input interface 515 receives a signal from the oxygen detection device 121 indicating the current oxygen content of each furnace and sends a control signal based on the signal returned by the oxygen detection device 121 to control the oxygen conditioning device 130 to adjust the oxygen content in the furnace chamber.

Although the present disclosure has been described in connection with examples outlined above, various alternatives, modifications, variations, improvements, and/or substantial equivalents, whether known or foreseeable now or in the near future, may be apparent to those having at least ordinary skill in the art. In addition, the technical effects and/or technical problems described in the present specification are exemplary and not limiting; therefore, the disclosure in the present specification may be used to solve other technical problems and have other technical effects and/or may solve other technical problems. Therefore, examples of the present disclosure as set forth above are intended to be illustrative and not limiting. Various changes may be made without departing from the spirit or scope of the present disclosure. Therefore, the present disclosure is intended to include all known or earlier developed alternatives, modifications, variations, improvements and/or substantial equivalents.

What is claimed is:

1. An oxygen detection system for a reflow furnace comprising n furnace chambers and n gas channels, each gas channel T(i)(i=1, 2, . . . n) of the n gas channels having a gas channel inlet R(i=1, 2, . . . n) and a gas channel outlet C(i)(i=1, 2, . . . n), each furnace chamber L(i) (i=1, 2, . . . n) of the n furnace chambers being in fluid communication with the gas channel inlet R(i) of one gas channel T(I) of the n gas channels, wherein:

the n furnaces and the n gas channels are divided into at least two groups, the at least two groups comprising a first group of furnace chambers, a second group of furnace chambers, a first group of gas channels, and a second group of gas channels, wherein the first group of furnace chambers comprises j furnace chambers, the first group of gas channels comprises j gas channels, the second group of furnace chambers comprises k furnace chambers, the second group of gas channels comprises k gas channels; the first group of furnace chambers is in fluid communication with the first group of gas channels, and the second group of furnace chambers is in fluid communication with the second group of gas channels, wherein j+k=n, the oxygen detection system comprising:

a first gas receiving device comprising a first chamber configured to be in switchable fluid communication with a gas channel outlet C(i) of each gas channel T(i) of the first group of gas channels such that gas in each furnace chamber L(i) of the first group of furnace chambers is switchable into the first chamber;

a second gas receiving device comprising a second chamber configured to be in switchable fluid communication with a gas channel outlet C(i) of each gas channel T(i) of the second group of gas channels such that gas in each furnace chamber L(i) of the second group of furnace chambers is switchable into the first chamber;

an oxygen detection device switchably in fluid communication with the first chamber and the second chamber;

a gas suction device switchably in fluid communication with the first chamber and the second chamber; and a chamber switching device switchably communicating the oxygen detection device with one of the first chamber and the second chamber, and the chamber switching device switchably communicating the gas suction device with the other of the first chamber and the second chamber in fluid communication;

wherein, the second chamber is in fluid communication with the oxygen detection device while the chamber switching device enables the fluid communication of the first chamber and the second chamber and the second chamber is in fluid communication with the gas suction device; and wherein, when the chamber switching device fluidly connects the second chamber with the oxygen detection device, the first chamber is fluidly isolated from the oxygen detection device and the first chamber is in fluid communication with the gas suction device.

2. The oxygen detection system of claim 1, further comprising:

a first gas channel switching device that enables alternating fluid communication of the first chamber with the gas channel outlet C(i) of each gas channel T(i) in the first group of gas channels; and a second gas channel switching device that enables rotating fluid communication of the second chamber with the outlet C(i) of each gas channel T(i) in the second group of gas channels.

3. The oxygen detection system according to claim 2, wherein the chamber switching device is configured to rotatingly fluidize the first chamber and the second chamber with the oxygen detection device and fluidly isolating the second chamber and the first chamber from the oxygen detection device on a rotational basis, and the second chamber and the first chamber are rotationally in fluid communication with the gas suction device and the first chamber and the second chamber are rotationally fluidly isolated from the gas suction device.

4. The oxygen detection system according to claim 3, wherein the oxygen detection system further comprises a control device configured to control the chamber switching device, the first gas channel switching device, and the second gas channel switching device.

5. The oxygen detection system of claim 4, wherein:

the first group of furnace chambers comprises furnace chambers in the odd sequence L(1), L(3), L(5), . . . ;

the second group of furnace chambers comprises furnace chambers in the even sequence L(2), L(4), L(6), . . . ;

The detection sequence of the first group of furnace chambers by the oxygen detection device is: L(1), L(3), L(5), . . . ; and The detection sequence of the second group of furnace chambers by the oxygen detection device is: L(2), L(4), L(6), . . . .

6. The oxygen detection system of claim 5, wherein the control device is configured to, when the oxygen detection device detects the oxygen content in the furnace chamber L(1) in the first group of furnace chambers:

(i) control the first gas channel switching device such that a corresponding gas channel outlet C(1) of the furnace chamber L(1) is in fluid communication with the first chamber such that the first chamber receives gas from the furnace L(1);

(ii) control the second gas channel switching device such that a corresponding gas channel outlet C(2) of and a second group of furnace chambers L(2) is in fluid communication with the second chamber such that the second chamber receives gas from the furnace L(2); and (iii) control the chamber switching device to fluidly communicate the oxygen detection device with the first chamber such that the oxygen detection device is able to detect the oxygen content in the furnace chamber L(1) and the gas suction device is in fluid communication with the second chamber such that the gas of the furnace chamber L(2) is filled with a gas flow path from the furnace chamber L(2) to the gas suction device.

7. The oxygen detection system of claim 6, wherein the control device is configured to, when the oxygen detection device detects the oxygen content in the furnace chamber L(2) in the second group of furnace chambers:

(i) control the second gas channel switching device to maintain communication with the gas channel outlet C(2) and the second chamber corresponding to the furnace chamber L(2) so that the second chamber receives gas from the furnace chamber L(2);

(ii) control the first gas channel switching device such that a respective gas channel outlet C(3) with a furnace chamber L(3) in the first group of furnace chambers is in communication with the first chamber such that the first chamber receives gas from the furnace chamber L(3); and (iii) control the cavity switching device to fluidly communicate the oxygen detection device with the second chamber such that the oxygen detection device is able to detect the oxygen content in the furnace chamber L(2) and communicate the gas suction device with the first chamber such that the gas of the furnace chamber L(3) is filled with a gas flow path from the furnace chamber L(3) to the gas suction device.

8. The oxygen detection system of claim 3, wherein the chamber switching device comprises:

a first inlet of a chamber switching device, a first inlet of a chamber switching device, and the first chamber being in fluid communication;

a second inlet of a chamber toggle device, the second inlet and the second chamber being in fluid communication;

a first outlet of the chamber switching device, wherein the control device is configured to control the first outlet of the chamber switching device alternatively in fluid communication with one of the first inlet of the chamber switching device and the second inlet of the chamber switching device; and a second outlet of the chamber switching device, wherein the control device controls the second outlet of the chamber switching device alternatively in fluid communication with the other of the first inlet of the chamber switching device and the second inlet of the chamber switching device.

9. The oxygen detection system of claim 2, wherein:

the first gas channel switching device includes a plurality of first gas channel switching switches, wherein the control device is configured to control the plurality of first gas channel switching switches to enable alternating fluid communication of the first chamber with the gas channel outlet C(i) of each gas channel T(i) in the first group of gas channels; and the second gas channel switching device includes a plurality of second gas channel switching switches, wherein the control device is configured to control the plurality of second gas channel switching switches to enable alternating fluid communication of the second chamber with the gas channel outlet C(i) of each gas channel T(i) in the second group of gas channels.

10. The oxygen detection system of claim 9, wherein:

each of the plurality of first gas channel switching switches including a first gas channel switching switch inlet and a first gas channel switching switch outlet, each first gas channel switching switch inlet being in fluid communication with one furnace chamber L(i) of the first group of furnace chambers; the first gas channel switching switch outlet is in fluid communication with the first chamber;

the control device is configured to control each respective first gas channel switching switch inlet to alternatingly and fluidly communicate with the first gas channel switching switch outlet such that the gas from the furnace chamber L(i) of the first group of furnace chambers corresponding to the first gas channel switching switch to enter the first chamber;

each of the plurality of second gas channel switching switches includes a second gas channel switching switch inlet and a second gas channel switching switch outlet, each of second gas channel switching switch inlets being in fluid communication with one furnace chamber L(i) of the second group of furnace chambers, the second gas channel switching switch outlet being fluid communication with the second chamber; and the control device is configured to control each of the second gas channel switching switch inlets to fluidly communicate with the corresponding second gas channel switching switch outlets such that the gas from the furnace chamber L(i) of the second group of furnace chambers corresponding to the second gas channel switching switch to enter the second chamber.

11. The oxygen detection system according to claim 9, wherein the chamber switching device is a 2-bit 4-way solenoid valve and the first gas channel switching switches and the second gas channel switching switches are 2-bit 3-way solenoid valves.

12. A reflow furnace comprising:

n furnace chambers;

n gas channels, each gas channel T(i)(i, i=1, 2, . . . , n) of the n gas channels having a gas channel inlet R(i)(i, i=1, 2, . . . n) and a gas channel outlet C(i)(i, i=1, 2, . . . , n), each furnace chamber T(i)(i=1, 2, . . . , n) of the n furnace chambers being fluid communication with the gas channel inlet R(i) of one gas channel T(i) of the n gas channels; and the oxygen detection system of claim 1.

* * * * *